July 21, 1942.  T. M. WRIGHT  2,290,518
AUTOMATIC PHONOGRAPH
Filed July 13, 1940  8 Sheets-Sheet 1

INVENTOR
Theodore M. Wright,
BY
Walter P. Geyer
ATTORNEY

July 21, 1942.

T. M. WRIGHT 2,290,518

AUTOMATIC PHONOGRAPH

Filed July 13, 1940

INVENTOR
Theodore M. Wright,
BY
Walter P. Guyer
ATTORNEY

July 21, 1942.　　　T. M. WRIGHT　　　2,290,518
AUTOMATIC PHONOGRAPH

Filed July 13, 1940　　　8 Sheets-Sheet 3

Fig. 3.

INVENTOR
Theodore M. Wright,
BY
Walter P. Geyer
ATTORNEY

July 21, 1942.     T. M. WRIGHT     2,290,518
AUTOMATIC PHONOGRAPH
Filed July 13, 1940     8 Sheets-Sheet 5

Fig. 5.

INVENTOR
Theodore M. Wright,
BY
Walter P. Geyer
ATTORNEY

July 21, 1942.   T. M. WRIGHT   2,290,518
AUTOMATIC PHONOGRAPH
Filed July 13, 1940   8 Sheets-Sheet 8

INVENTOR
Theodore M. Wright,
BY
Walter P. Fryer
ATTORNEY

Patented July 21, 1942

2,290,518

UNITED STATES PATENT OFFICE 2,290,518

AUTOMATIC PHONOGRAPH

Theodore M. Wright, North Tonawanda, N. Y., assignor to The Rudolph Wurlitzer Company, North Tonawanda, N. Y., a corporation of Ohio Application July 13, 1940, Serial No. 345,349

16 Claims. (Cl. 274—10)

This invention relates to certain new and useful improvements in automatic phonographs, and more particularly to a continuous play phonograph for home or domestic use.

One of its objects is to provide a phonograph of this character which is simple, compact and inexpensive in construction, and which is designed to play a plurality of 10" or 12" records in succession and whereby a given program of record selections may be automatically played from start to finish as many times as desired without requiring the attention of an operator.

Another object of the invention is to provide an automatic phonograph for home use wherein the records to be played are supported in a stack on the turntable, and wherein means are provided for elevating the records successively and individually after play to a storage or supporting structure disposed axially over the turntable, and when the last record on the turntable has been played and elevated to the storage structure means are provided for automatically releasing the stored records and bodily returning them to the turntable in stack-like fashion in readiness for play.

A further object is to provide simple and reliable means for automatically effecting the successive transfer of the records as they are played to a point spaced above the turntable where they are stored to provide an operating clearance space for the tone arm, together with automatic means initiated by the tone arm for rendering the transfer means operable.

A still further object is to provide an automatic phonograph of this character which will play either 10" or 12" records irrespective of their location or arrangement in the record-stack, and wherein simple and positive means are provided for controlling the inward swing of the tone arm into proper playing relation with either a 10" or 12" record.

Other features of the invention reside in the construction and arrangement of parts hereinafter described and particularly pointed out in the appended claims.

In the accompanying drawings.

Similar characters of reference indicate corresponding parts throughout the several views.

In its general organization the phonograph comprises a horizontally and vertically swinging tone arm, a turntable which is continuously rotated in a fixed horizontal plane and which is adapted to support a stack of records thereon for successive play from top to bottom of the stack; record-supporting means disposed above the turntable for receiving and releasably supporting the records in stack-like arrangement after play in an overhead spaced relation to the next record to be played, whereby to provide an operating clearance space for the movement of the tone arm; record-elevating means movable substantially parallel to the turntable axis and laterally into engagement with a record after play for elevating and presenting it to the overhead record-supporting mechanism; means for actuating said record-elevating means and the tone arm at predetermined times in the playing cycle; and means governed by the tone arm when it reaches the end of play of a record for initiating such actuating means to in sequence lift the tone arm from the played record and swing it to one side of the turntable, elevate the played record to the overhead record supporting means, and then swing the tone arm in and down onto the next record to be played. After the several records on the turntable have been successively played and the last played record has been elevated to complete the transfer of the stack of records to the record-supporting means, a control means is provided which is automatically actuated and initiated at a predetermined time by the record-elevating means for releasing the records as a stack from the record supporting means, whereby they are lowered bodily onto the turntable for again effecting the successive playing thereof.

The phonograph is adapted to play either 10" or 12" records irrespective of their location or arrangement in the record-stack and embodies means governed by the record-elevating actuating means and the record disks for controlling the inward swing of the tone arm into proper playing relation with either a 10" or 12" record.

Figure 1:
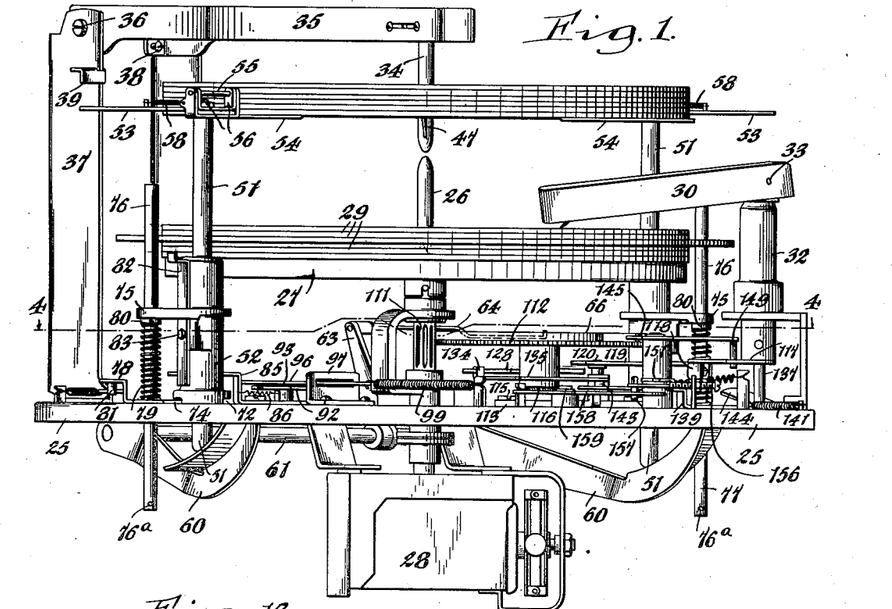
Figure 1 is a front elevation of the phonograph embodying my invention, the parts being shown in position for playing a 10" record.

The working parts of the phonograph are mounted on a suitable frame including a base plate 25 and rising therefrom substantially centrally thereof is an upright spindle 26 to which the turntable 27 is fixed, the lower end of the spindle being connected by suitable reducing gearing to an electric motor 28 which continuously rotates the turntable during operation of the machine. The turntable is adapted to support a plurality of superposed records 29 thereon in stacklike fashion and the spindle 26 extends sufficiently above the turntable to center the records thereon. The numeral 30 indicates a tone arm of ordinary construction which is mounted for horizontally-swinging movement on an upright sleeve 31 journaled in a suitable bracket 32 rising from the plate 25 at one side of the turntable and which is pivoted at 33 to swing vertically into and out of playing engagement with the record. As shown in Figure 1, the pivot 33 is disposed a substantial distance above the top of the turntable so that the tone arm is capable of swinging downwardly into engagement with the respective records as they are successively played from top to bottom of the stack.

Figures 13, 15, 16:
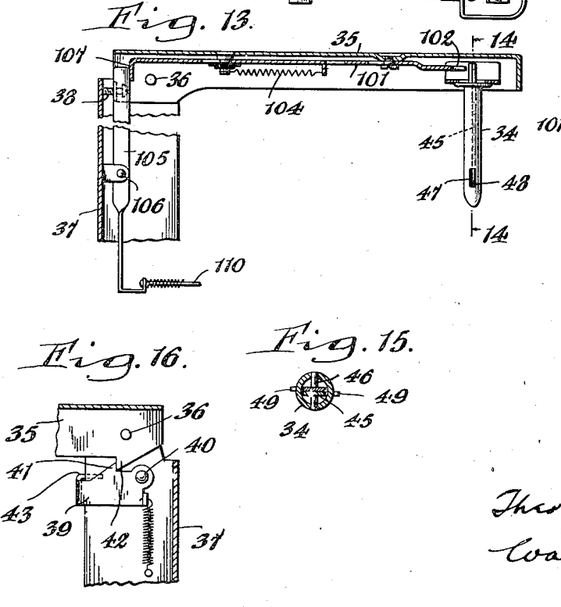
Figure 13 is a fragmentary vertical section of the overhead record supporting means taken substantially in the plane of line 13—13, Figure 3.
Figure 15 is a horizontal section taken on line 15—15, Figure 14.
Figure 16 is a fragmentary vertical section taken on line 16—16, Figure 3.

The means for supporting the records after they are played in an elevated stack in spaced, overhead relation to the turntable, and to any records borne thereby to provide an operating clearance for the tone arm, are preferably constructed as follows:

Disposed above and in opposing alined relation with the turntable-spindle 26 to form a detached continuation thereof is a record storage or receiving post or pin 34 adapted to receive the records after play in stack-like fashion, such pin being fixed at its upper end to the free inner end of a vertically-swinging arm 35 channeled in cross section and pivoted at 36 to a bracket 37 rising from the plate 25 at one side of the turntable. This arm has an adjusting and limiting screw 38 so that the proper clearance may be maintained between the opposing ends of the turntable spindle 26 and the record-receiving pin 34. To prevent any tendency of the arm to be rocked upwardly during the transfer of a record onto the storage pin, a spring-urged locking plate 39 is provided, which is pivoted at 40 to the bracket 37 immediately below the arm-pivot 36 and has a tooth or shoulder 41 normally engaging a companion shoulder 42 projecting downwardly from the arm 35, as shown in Figure 16. The spring associated with the latching plate normally urges its tooth 41 into register with the mating tooth 42 to prevent an upward movement of the arm 35 and its pin 34. A finger-tab 43 is provided on the free end of the locking plate so that it may be shifted downwardly against the tension of the spring to disengage the teeth 41, 42 and allow the arm 35 and its record-receiving pin 34 to be raised to the proper elevation to facilitate the application and removal of the records to and from the turntable 27.

The record-receiving pin is adapted to releasably retain the records thereon as they are transferred from the turntable thereto, and to this end this pin is preferably of hollow or tubular form to receive a pair of contractible latching fingers 45 pivoted intermediate their ends at 46 crosswise of the pin and terminating at their lower ends in downwardly-tapering heads 47 which project outwardly through companion slots 48 disposed at diametrically opposite sides of the lower portion of the pin. These heads terminate at their upper ends in horizontal shoulders 49 upon which the lowermost record applied to the pin is adapted to rest, that is, the marginal edge of the record about the record hole rests upon these shoulders. When contracted, the finger-heads enter the hollow portion of the pin 34 to enable the record to be passed over the pin. At their upper ends these fingers are provided with springs 50 which tend constantly to urge them to their expanded supporting position shown in Figure 14.

The elevating means for automatically lifting the records one at a time after play into their stacked storage position on the record-receiving pin 34, is preferably constructed as follows:

Disposed at diametrically opposite sides of the turntable are upright elevating spindles 51 which are rotatably and slidingly mounted in bearing brackets 52 rising from the base plate 25 and which are provided at their upper ends with radially disposed, combined spindle-limiting and clutching members 53 arranged to abut flatwise against the top side of the top record on the turntable and functioning at one time as a gage or stop to limit the downward travel of the spindle so as to properly position the elevating means at a proper elevation to operatively engage the next record to be transferred from the turntable to the overhead storage position on the pin 34. Disposed in cooperating relation with the spindle-limiting members 53 and axially spaced therefrom a distance approximately equal to the thickness of a record are companion radially-disposed record pick-up members 54 which may be slightly champfered at their peripheral edges so as readily to enter between the record to be elevated and that record immediately beneath it. By preference, the limiting members 53 are fixed adjacent the upper ends of their companion spindles 51 while the cooperating record pick-up members 54 are pivoted at 55 to upstanding lugs 56 rising from said limiting members, the inner portions of the pick-up members having an opening 57 therein which is larger in diameter than the elevating spindle to enable the pick-up members to have a limited vertical displacement relative to the companion limiting member. A spring 58 associated with each of the pick-up members 54 and connected at one end thereto and at its opposite end to the companion limiting member 53, serves to yieldingly resist displacement of the former relative to the latter and enables the pick-up member to be self-adjustable into proper seating engagement with a record to be elevated. An adjusting screw 59 is applied to each of the limiting members 53 for abutting engagement with the companion pick-up member to facilitate the proper spacing between these members. When the combined spindle-limiting and clutching members 53 on the down stroke of their spindles abut the marginal top side of the uppermost record on the turntable, as shown by full lines in Figures 7 and 10, they not only serve to position the pick-up members at the proper elevation for engagement with the underside of that record but such members 53 function as clutching elements in that the rotation of such engaged record causes a rotating movement to be imparted to these members and hence to their spindles, due to the friction between the record and such members, thereby causing the latter to be swung clear of the record stack and at the same time swing the companion pick-up members 54 into supporting engagement beneath the top record on the turntable and that record immediately beneath it, so that when the spindles are subsequently elevated, that top record which at such time has been played will be lifted and presented to the record storage pin 34. After the lowermost record on the turntable has been played and before it is elevated to a corresponding position in the overhead storage stack and in the subsequent cycle of operations which follow, the spindle-limiting and clutching members 53, on the downstroke of their spindles, abut the marginal top side of that record to effect a rotation of the spindle-bearing members 53 and 54 to the position shown in Figure 8 for the purpose of initiating, at that elevation of those members, the actuation of a mechanism to be hereinafter described for effecting the replacement of the overhead stack of records as a unit onto the turntable.

Figures 7, 8:
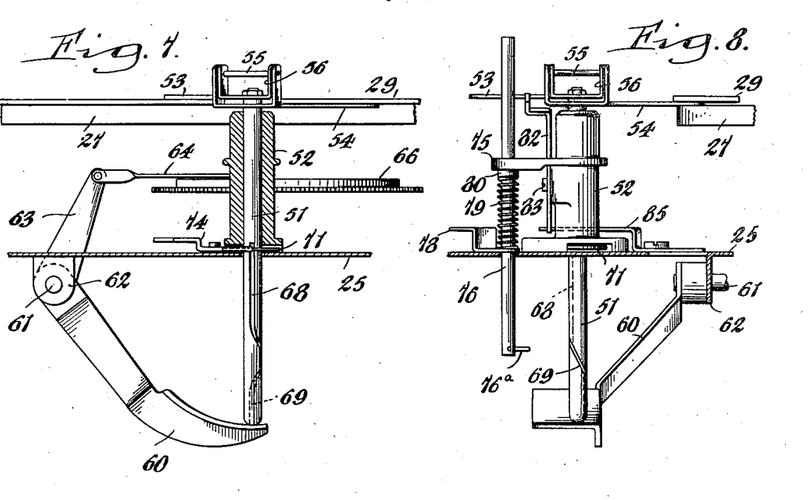
Figure 7 is a fragmentary vertical section of one of the record-elevating spindles shown in a position in readiness for elevating the last played record on the turntable.
Figure 8 is a side view of Figure 7, partly in section, showing the elevating spindle in its lowered or tripping position prior to its being elevated into engagement with and then lowering the elevated stack of records bodily onto the turntable.

The elevating movements of the spindles 51 are preferably controlled by vertically-swinging rock levers 60 applied to the ends of a horizontal shaft 61 journaled in suitable bearings 62 applied to the underside of the frame-plate 25, the top sides of the free ends of these levers abutting the lower ends of the spindles in the manner shown in Figures 1, 7 and 8. This shaft is adapted to be rocked in opposite directions at predetermined times to effect the raising and lowering of the spindles 51 and to this end a crank arm 63 is fixed on said shaft and is connected by a link or pitman 64 with a crank-pin 65 applied to an intermittently rotatable cam 66 journaled on an upright stub-shaft 67.

Figure 3:
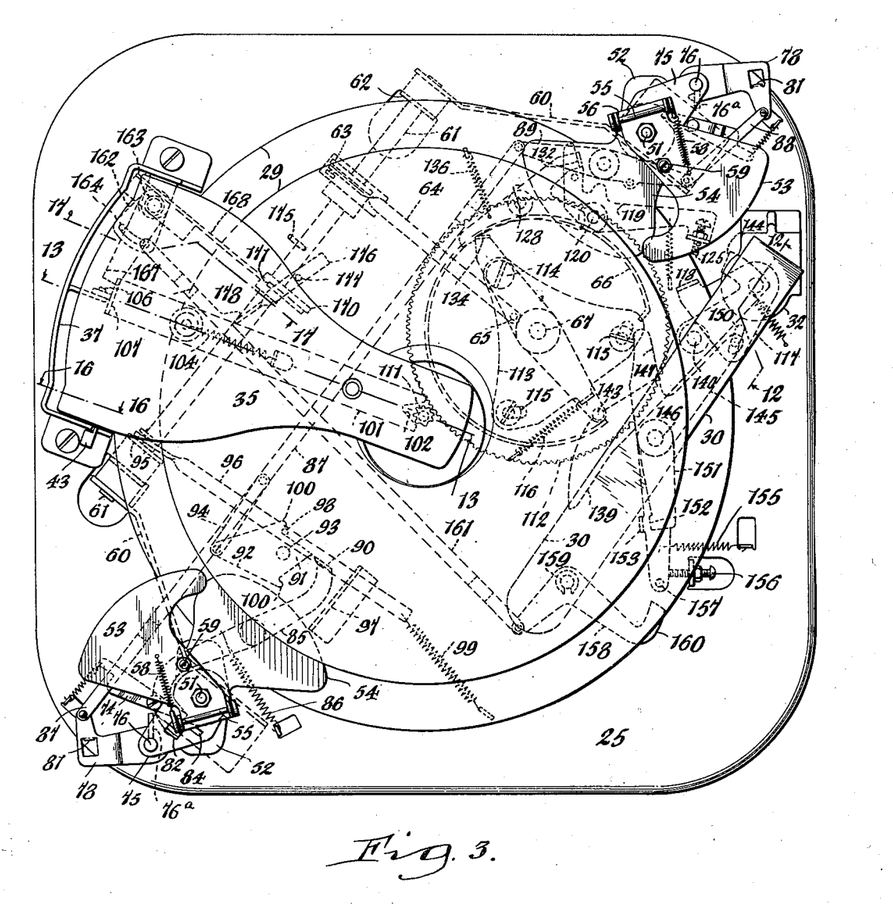
Figure 3 is a top plan view of the phonograph, the parts being shown in position for playing a 10" record.
Figure 9:
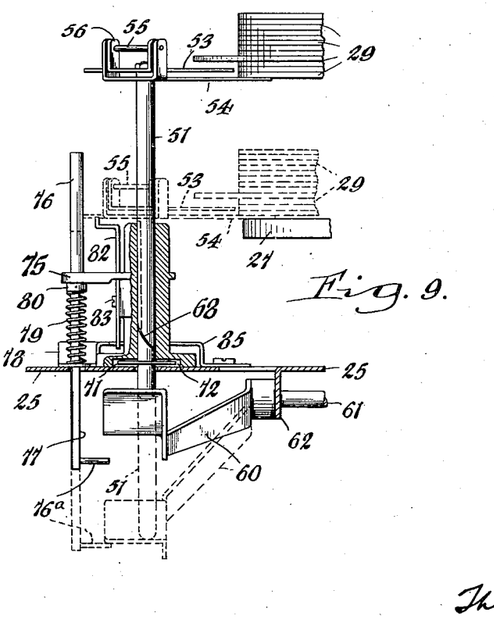
Figure 9 is a similar view, partly in section, showing the elevated stack of records being lowered onto the turntable by the elevating spindles.
Figure 12:
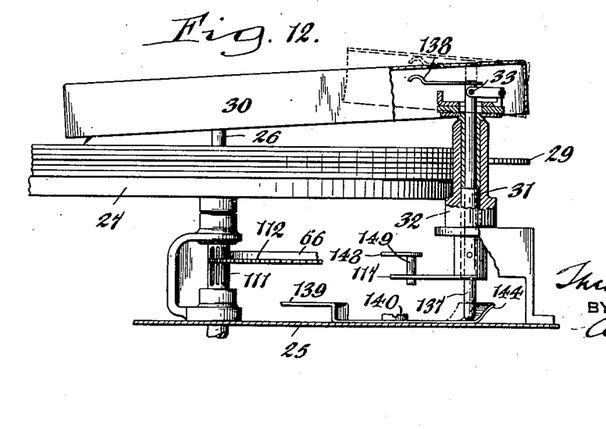
Figure 12 is a fragmentary vertical section of the tone arm mounting taken substantially in the plane of line 12—12, Figure 3.

After a played record has been elevated onto the receiving pin 34, the spindles 51 remain elevated during the playing of the next record and spindle members 53 and 54 assume the positions shown in Figures 1 and 3 with the pick-up member 54 still disposed beneath the bottom record in the elevated stack. During the lowering movement of the spindles preparatory to picking up the played record, a counter-clockwise movement is imparted to these spindles for swinging the pick-up members 54 outwardly clear of the peripheries of the records but in adjoining edgewise relation thereto, and for bringing the limiting members 53 inwardly to a point over the marginal top side of the top record on the turntable. For this purpose, each spindle 51 is provided with a longitudinal groove which includes an upper straight portion 68 and a spiral portion 69 which extends approximately halfway around the spindle. Arranged to cooperate with this slot is a key 70 formed on a disk or washer 71 loosely fitted about the spindle and held against endwise movement relative thereto in a socket 72 formed between the spindle bracket 52 and the plate 25 of the chassis-frame, as shown in Figures 7 and 9. In its periphery the disk 71 has a locking notch 73 with which a pivoted, spring-pressed pawl 74 is adapted to engage for normally preventing rotation of the disk in a clockwise direction. In the elevated position of each spindle, shown in Figure 9, the lower end of the spiral portion of its groove is in register with the disk-key 70, so that during the initial downstroke of the spindle it is turned relatively to the disk in a counter-clockwise direction to release the pick-up member 54 from the record and present the gauge or limiting member 53 into the marginal plane of the top record on the turntable. During this partial rotation of the spindle, the pawl 74 holds the washer against rotation in a clockwise direction. When the gauge member 53 strikes the marginal face of the rotating top record on the turntable, it being understood that the turntable rotates continuously during the operation of the phonograph, the frictional contact therewith causes the turning of the spindle in a counter-clockwise direction, the pawl permitting the disk 71 to turn bodily or as a unit with the spindle to bring the pick-up member 54 beneath the record to be elevated. At this time, the disk-key 70 is engaged with the straight portion 68 of the spindle-groove, so that during the subsequent elevating movement of the spindle the key first rides in the straight portion of the spindle-groove and during the last portion of the upward travel the key rides in the spiral portion 69 of the groove and turns in a counter-clockwise direction relative to the spindle until the pawl 74 drops into the notch 73 which occurs when the spindles 51 reach their full upward travel, and during this full up-stroke the record pick-up and gauge members 53 and 54, respectively, remain in their last projected position.

Figure 4:
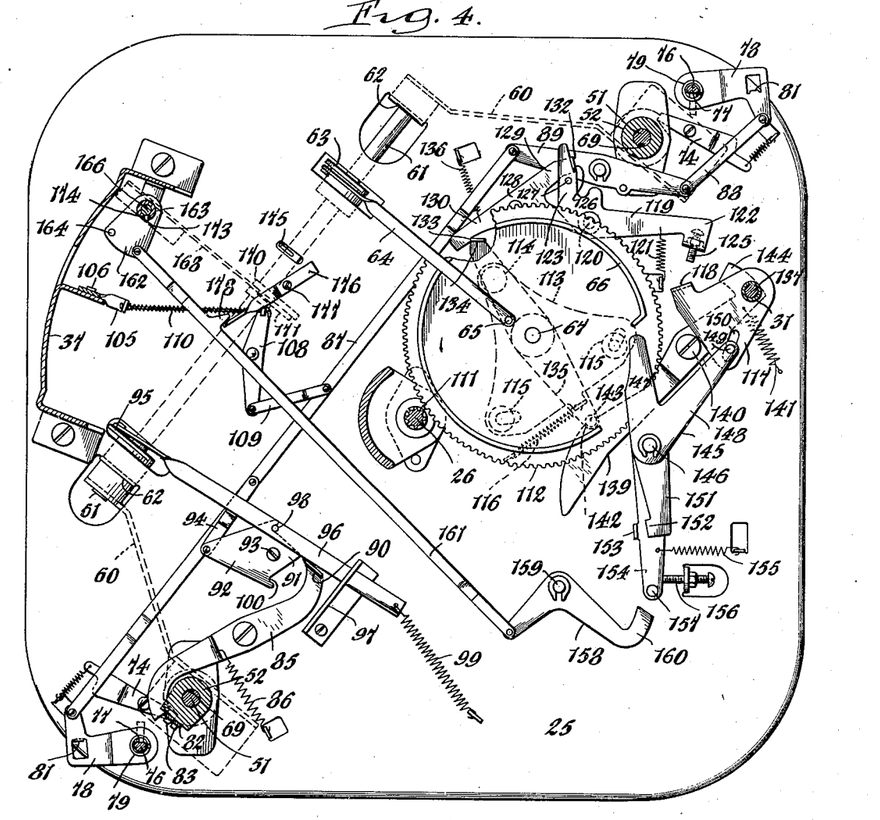
Figure 4 is a horizontal section taken substantially in the plane of line 4—4, Figure 1.
Figure 5:
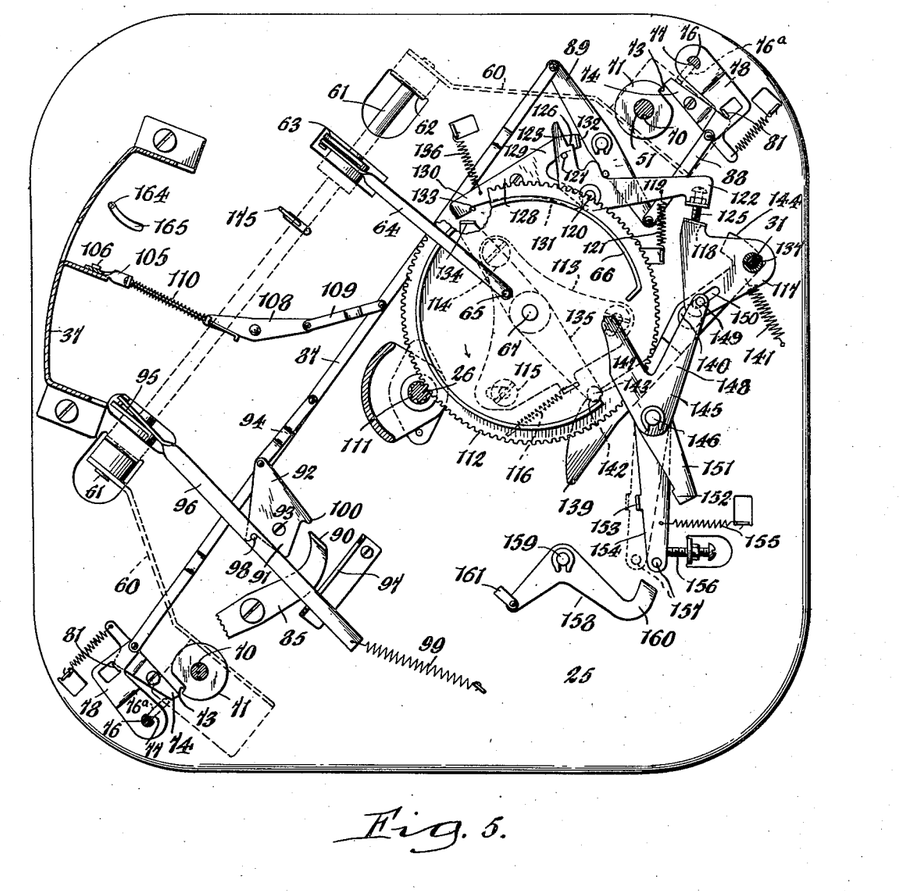
Figure 5 is a similar sectional view showing the position of the parts in the tone arm trip position effected after the playing of a record.

Attention is here called to the fact that after the lowermost record on the turntable has been lifted to the bottom of the stack of those records in storage position on the pin 34, the spindles 51 are prevented from rotation on the down stroke during the lowering of the stack of records to their initial position on the turntable, and at this time the pawls 74 are held out of engagement with their companion disks 71 so that on the downstroke of the spindles there is no rotation imparted to them but they merely travel downwardly with their pick-up members 54 maintained in supporting engagement with the records. The means for governing the movement of the pawls to a released position at such time prior to the lowering of the overhead stack back onto the turntable so as to control the non-rotating lowering movement of the elevating spindles 51 is preferably constructed as follows:

Projecting radially from and fixed to each of the spindle-bearing brackets 52 is an arm 75 in which is guided a vertically-displaceable rod 76 having a flat portion 77 extending lengthwise thereof on which is mounted a horizontally-swinging lever 78, the rod constituting a movable pivot or fulcrum for this lever. A spring 79 coiled about the rod between a collar 80 thereon, which normally abuts the underside of the guide arm 75, and the top side of the lever 78 normally urges the rod to the position shown in Figures 1, 6 and 9, in which elevated position it functions to limit the turning of the companion spindle 51 and its record-engaging members 53, 54 during the movement of the limiting member 53 from engagement with the record and the simultaneous projection of the pick-up member 54 into engagement beneath the record. Projecting from the lever 78 is a lug 81 which, when the lever is swung from the position shown in Figure 4 to the position shown in Figure 5, is adapted to abut the companion pawl 74 and release it from latching engagement with the corresponding disk 71, in which position of the parts the elevating spindles 51 are prevented from turning during their down stroke when restoring the overhead stack of records to the turntable.

Figures 6, 10, 11:
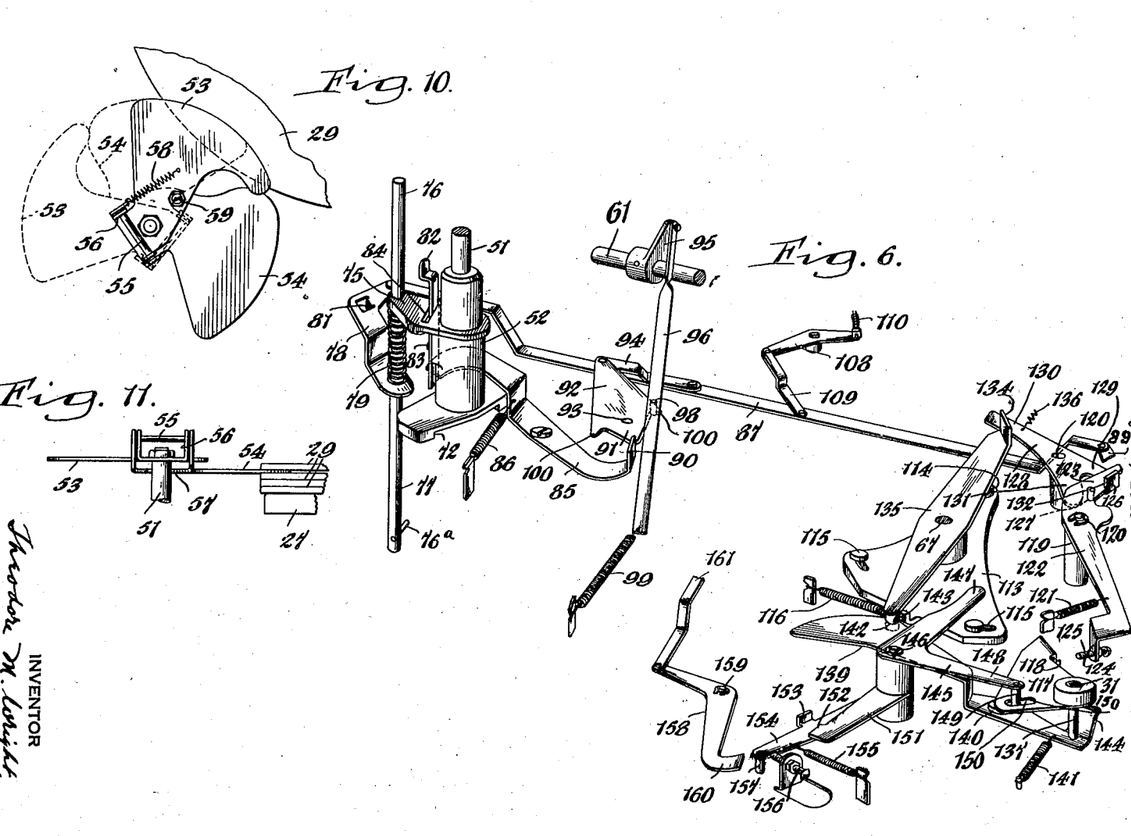
Figure 6 is a perspective view of the tone arm controlled trip mechanism and associated parts in a position for playing a 10" record.
Figure 10 is a fragmentary top plan view of one of the record-elevating units in its lowered position preparatory to being moved into supporting engagement beneath a record about to be elevated.
Figure 11 is a fragmentary side view showing the record pick-up member of one of the elevating units in position preparatory to elevating a record.

The means for initiating the movement of the pawls 74 to their released position is shown clearly in Figures 4, 5 and 6 and consists of a vertically-swinging trip lever 82 pivoted intermediate its ends at 83 to one of the bearing brackets 52 below the guide arm 75 thereof and extending at its upper end through a slot 84 provided in such arm. The upper end of this trip lever is disposed in the path of turning of the companion spindle-limiting member 53 at the lowermost end of the stroke of the spindle 51, that is, the downstroke defined by the bottom record on the turntable, as shown in Figures 7 and 8, so that when said member is displaced from contact with such bottom record to bring the companion pick-up member 54 into supporting engagement therewith, such limiting member will abut the upper end of the trip lever 82 and rock it in a direction to in turn present its lower end into engagement with and actuate a horizontally-swinging rock lever 85 from the position shown in Figure 4 to the position shown in Figure 5. A spring 86 connected to this rock lever normally urges it and the trip lever 82 to the position shown in Figures 1, 4 and 6. The companion levers 78 are connected to each other for movement in unison by links 87, 88 and an interposed rock lever 89. At its inner end the rock lever 85 terminates in an upstanding lug 90 which is normally disposed substantially in registering, abutting relation with the vertex of the V-shaped end 91 of a horizontally-shiftable cam plate 92 pivoted intermediate its ends at 93 to the top of the base plate 25 and connected at its outer end by a tie bar 94 to the link 87, so that when this cam plate is shifted in one direction or the other corresponding movements are transmitted to the linkage assembly 87, 88 and 89 and thence to the pawl-governing levers 78. Mounted on the shaft 61 is a crank arm 95 to which is connected a pitman 96 which overlies the cam plate 92 and is guided at its inner free end in a slotted plate 97, shown in Figures 1 and 5. Depending downwardly from this pitman is a pin 98 which is adapted to traverse the V-shaped end 91 of the cam plate and at a predetermined time in the outward stroke of the pitman transmit motion to the cam plate to in turn rock the levers 78 in a direction to release the pawls 74 from their companion disks 71. A spring 99 connected to the free end of this pitman constantly urges it in a direction to maintain the pin 98 in contact with one side or the other of the V end of the cam plate. At its opposite side edges the V-shaped end 91 of this plate has stop shoulders 100 with one or the other of which the pitman-pin 98 is adapted to engage at predetermined times in the cycle of operations. In the position of the parts shown in Figures 4 and 6, the rock lever lug 90 is substantially abutting the vertex of the cam end of the plate 92 so that on the in-stroke of the pitman 96 its pin 98 merely travels along the adjoining side of the cam portion 91 and the contiguous side of the lug, the latter preventing a lateral displacement of the pitman-pin to the opposite side of such cam portion, so that in this position of the parts there is a mere idling of the pitman without any transmission of motion to the cam plate 92. This action takes place during all the record changing operations excepting that one wherein the last record is effected. However, in the position of the parts shown in Figure 5, the rock lever 85 is in such position that its lug 90 is displaced from the vertex end of the cam plate so as to permit a lateral spring-urged displacement of the pitman 96 at the end of its inward stroke and cause its pin 98 to travel around the vertex of the cam 91 into traversing engagement with the opposite side thereof. On the outward stroke of the pitman, which takes place during the up-stroke of the record-elevating spindles 51, the pin 98 encounters the adjoining stop shoulder 100 on the cam plate and causes the latter to be rocked from the position shown in Figure 4 to the position shown in Figure 5, during which time it transmits motion to the linkage 87, 88 and 89, and accordingly rocks the levers 78 into their pawl-releasing position, this action taking place during the elevation of the bottom record on the turntable to its elevated position in the overhead stack. On the subsequent inward stroke of the pitman, which takes place during the downstroke of the record-elevating spindles, and at which time the stack is bodily lowered onto the turntable—by reason of the record-engaging fingers 45 on the storage pin 34 having been, previously to the start of the down-stroke, automatically contracted and released from supporting engagement with the records—the pitman-pin 98 travels along the front edge of the V-shaped nose 91 of the cam plate, viewing Figure 5, being urged to do so by the spring 99, until it reaches the vertex of such nose. When the records are restored to the turntable, the pick-up members 54 engage the top of the turntable and the rotation of the latter causes such members to be rotated clear of the record stack, so as not to interfere with the subsequent elevating stroke of the spindles. Thereafter, on the outward stroke of the pitman, which takes place during the up-stroke of the elevating spindles, the pitman-pin travels along the rear edge of the V-shaped nose and encounters the companion shoulder 100, causing the cam plate 92 to be shifted from the position shown in Figure 5 to its initial or normal position shown in Figure 4, thereby restoring the pawls 74 into latching engagement with the companion spindle-disks 71, so that upon the next down-stroke of the spindles, the latter will operate normally again to swing the pick-up members 51 out of a record-supporting position and the limiting members 53 into record contacting position during the record-changing cycles.

Figure 2:
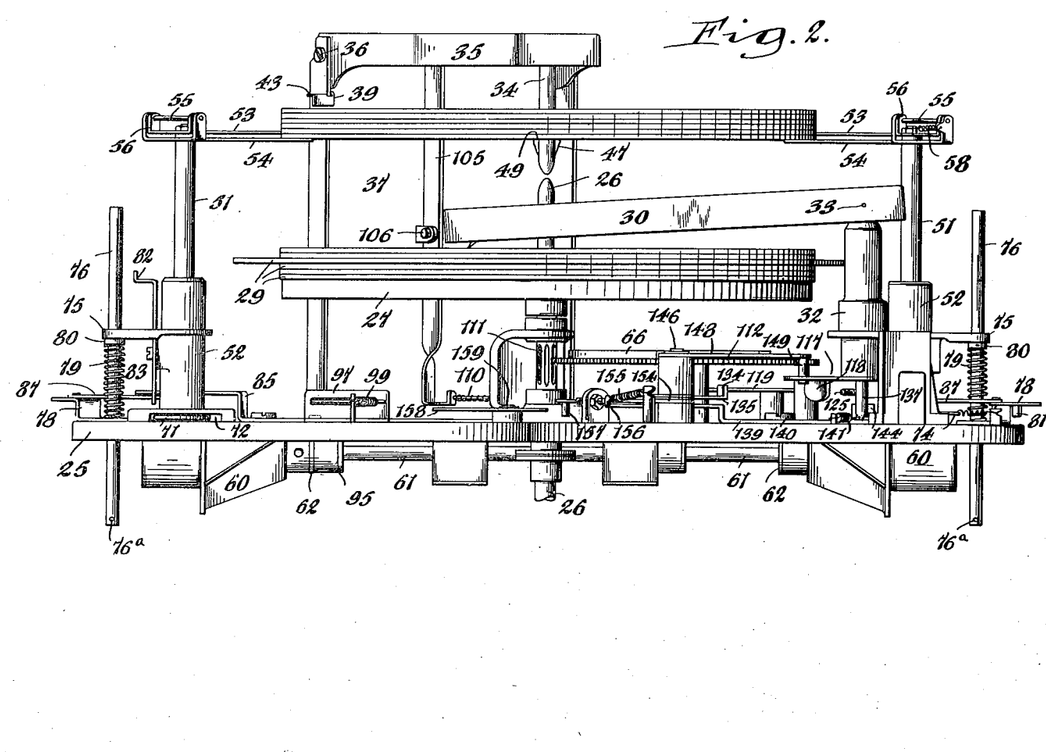
Figure 2 is a side elevation thereof.

During the turning of the spindle-members 54 clear of the record-stack when such stack is deposited as a unit on the turntable, it is necessary to depress the companion stop rods 76 below the plane of the spindle-limiting members 53, so that the latter can turn with their spindles. For this purpose, each rod has a tappet pin 76$^a$ projecting laterally from its lower end which is disposed in the path of the downward swing of the adjoining spindle-elevating arm 60 at such time as the overhead stack is being lowered onto the turntable, whereby said rod is depressed clear of the path of turning of the spindle-members. On the up-swing of such elevating arm, the rod 76 is returned to its normal elevated position by its spring 79. Normally the tappet pin 76$^a$ is out of the path of movement of the adjoining elevating arm 60, as shown in Figures 1, 2 and 3, and is only projected into its path when the rod 76 has been turned by its companion lever 78 to a position to release the pawl 74 from its spindle-disk 71, as shown in Figures 5 and 9.

Figure 14:
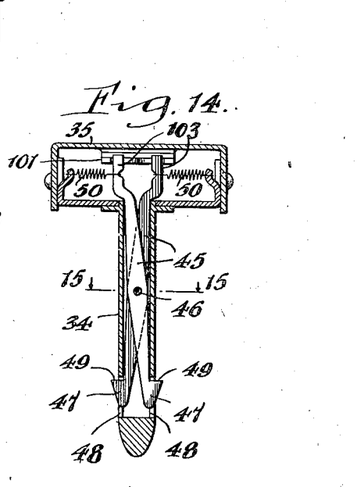
Figure 14 is an enlarged transverse vertical section taken in the plane of line 14—14, Figure 13.

The means for automatically contracting and releasing the record-engaging fingers 45 on the record storage pin 34 prior to lowering the elevated stack as a unit back onto the turntable is preferably constructed as follows:

Guided for movement in a direction radially of the turntable on the underside of the storage pin supporting arm 35 is a shiftable bar 101 which is provided at its inner end with a V-shaped notch 102 whose edges engage lugs 103 formed at the upper ends of the latching fingers, as shown in Figures 13 and 14. This bar may be guided in any appropriate fashion on the supporting arm 35 and has a spring 104 connected thereto for normally urging it outwardly from engagement with the fingerlugs 103. When this bar is shifted inwardly, it causes the fingers to be contracted so that their shouldered-heads 47 are contained within the area of the tubular pin 34 to enable the records to be removed therefrom.

The shifting of the bar 101, to effect the release of the fingers 45 from supporting engagement with the records on the pin 34, is initiated during the release of the pawls 74 from their companion spindle-disks 71 and to this end I provide a vertically-swinging lever 105 pivoted intermediate its ends at 106 to the arm-bracket 37, the upper end of such lever abutting a depending lip 107 formed on the outer end of the bar. This lever is actuated in a direction to project the shiftable bar 101 inwardly during the movement of the link 87 to its pawl-releasing position through the medium of a horizontally-swinging rock arm 108 connected at one end by a link 109 to the link 87 and at its other end to a yieldable link 110 joined to the lower end of the lever 105. By this construction, when the link 87 is moved to its pawl-releasing position, the shiftable bar 101 is moved to its finger-contracting position, so that the elevated records will freely ride off the pin 34. During the act of restoring the pawls 74 to their normal position the link 87 accordingly restores the shiftable bar 101 to its released position, allowing the record-engaging fingers 45 to be spring-urged outwardly to their record-supporting position.

The means for transmitting motion to the cam 66 in a counter-clockwise direction, viewing Figures 3, 4 and 5, at predetermined times to automatically govern the elevating movements of the spindles 51 as well as to control the movements of the tone arm to and from play position, are constructed as follows:

The turntable spindle 26 has a pinion 111 formed thereon with which a gear 112, loosely mounted on the stub-shaft 67 and forming a part of or fixed to the cam 66, is adapted to intermittently mesh when a record-changing operation is effected. The stub-shaft is fixed to a horizontally-shiftable plate 113, of substantially triangular shape in plan, which rests on the top side of the base plate 25 and which is pivoted at one end at 114 thereto and guided at its other end for a limited pivoting movement by a pin and slot connection 115. A spring 116 is connected to the free end of this plate and tends normally to shift it together with the combined cam 66 and gear 112 in a direction to bring the latter into meshing engagement with the pinion 111, as shown in Figure 5, and in which position the parts are in record-changing position. For each record-changing cycle the cam makes one revolution, during which time the tone arm 30 is lifted from the played record and swung to a position at one side of the turntable, the elevating spindles 51 are lowered and then raised to pick up the played record and elevate it onto the overhead record-supporting pin 34, and the tone arm then swung inwardly and lowered onto the playing groove of the next top record on the turntable stack.

When the tone arm reaches the end of playing a given record, it initiates a mechanism for causing the gear 112 to be brought into engagement with the driving pinion 111 to transmit motion to the cam 66. This mechanism consists of a segmental plate 117 fixed to the lower end of the tone arm bearing-sleeve 31 to swing horizontally therewith and having at one edge thereof a depending lug 118 adapted to engage a horizonally-swinging latching lever 119 during the final feed-in stroke of the tone arm, as when the stylus encounters the eccentric terminal groove of the record. This latching lever is pivoted at 120 to the base plate 25 and has a spring 121 connected thereto for normally urging it to its latched position and includes arms 122, 123, the arm 122 including a lug 124 having an adjusting screw 125 mounted thereon which is adapted to be engaged by the segmental plate-lug 118 at a predetermined time in the inward movement of the tone arm. The companion arm 123 has a notch or latching shoulder 126 in one edge thereof and a depending stop pin 127 inwardly thereof. The numeral 128 indicates a horizontally-swinging trip lever having three arms 129, 130 and 131, the arm 129 having an upstanding lug 132 adapted to interlock with the notch 126 of the latching lever 119 in the gear-releasing or record-playing position of the parts as shown in Figure 4. The arm 130 has a notch or shoulder 133 in its inner edge which is disposed in the path of travel of a lug 134 projecting from one arm of a fulcruming lever 135 located between the cam 66 and the shiftable plate 113 and pinned or otherwise secured to the cam or gear 112 to rotate therewith. A spring 136 is connected to the three-arm trip lever 128 for normally urging it into latching engagement with the latching lever 119, as shown in Figures 4 and 6. During a record-changing cycle the arm 131 of the trip lever 128 is disposed in the path of rotation of the fulcruming lever-lug 134, so that at the end of travel of a single revolution of the cam 66 such lever is restored from the position shown in Figure 5 to the latched position shown in Figures 4 and 6, and wherein the lug 132 on said lever 128 is latched behind the shoulder 126 of the latching member 119. Upon the lever-lug 134 abutting and latching behind the shoulder 133 on the arm 130 of the lever 128, a fulcruming action is transmitted to the lever 135 to cause a lateral displacement of such lever and the shiftable plate 113 to effect the release of the gear 112 from the pinion 111. The parts remain in this position during the playing of a record.

The initial turning movement of the cam 66 governs a means for lifting the tone arm 30 out of contact with the record after play. For this purpose an elevating pin 137 extends axially through the tone arm sleeve 31 and is provided at its upper end with a tappet arm 138 which is adapted, when the pin is lifted, to contact the tone arm outwardly of the pivot 33 and elevate the tone arm from the full line position to the dotted line position shown in Figure 13. The lower end of this elevating pin normally rests upon the contiguous top side of a lever 139 pivoted intermediate its ends at 140 for horizontal swinging movement and having a spring 141 connected thereto for urging it in a direction to bring a locking notch 142 provided therein into latching engagement with a pin 143 applied to the fulcruming lever 135. Extending laterally from that end of the lever 139 on which the elevating pin 137 normally rests, is an elevating cam or upwardly-offset lug 144 which is adapted, when said lever is rocked in a direction towards the pin, to present its cam thereto to elevate the pin and in turn lift the tone arm from the record. When the tone arm effects the tripping of the mechanism to transmit motion to the cam 66, the lever 135 is rotated with the cam and its pin 143 is released from the lever 139, thereby causing the spring 141 to rock such lever in a direction to bring its cam 144 beneath the elevated pin 137 and automatically lift the tone arm off the record.

After a record has completed its play and the tone arm trips the mechanism for initiating the movement of the cam 66, the outward swing of the tone arm to its initial or non-play position is effected by a horizontally-swinging bell crank lever 145 fulcrumed at 146 adjacent the periphery of the cam and having its arm 147 disposed in the path of travel of the cam, while its companion arm 148 is coupled by a pin and slot connection 149, 150 with the adjoining end of the segmental plate 117 which swings with the tone arm. As shown in Figures 4 and 5, the cam 66 has a gap or passage therein through which the arm 147 may extend during the gradual in-swing of the tone arm while playing a record, so that when the cam is actuated to initiate the record-changing operation, it encounters such arm and rocks the lever 145 and the plate 117 in a direction to swing the tone arm to non-play position, the cam retaining the parts in such position until its gap registers with the arm 147. Also constituting a part of the bell crank lever 145 to swing therewith is a third arm 151 whose free end has a lateral stop lug 152 thereon arranged to abut a companion stop lug 153 formed on an independent, parallel-swinging lever 154 pivoted on the fulcrum 146 and governing the inward swing of the tone arm for proper playing register with the playing groove of the record. A spring 155 connected to said lever 154 normally urges it against an adjustable stop screw 156, in which position the lever-lug 153 is properly set for controlling the registration of the tone arm stylus with the start of the playing groove of a 10" record. During the time that the bell crank arm 147 is in contact with the cam 66, the tone arm is positioned outwardly of the 10" record and the lever 154 is retained by the arm 151 against the tension of the spring 155 in its maximum inward position and out of contact with the screw 156, as shown by dotted lines in Figure 5. As soon as the arm 147 drops off the cam and into the gap formed therein, assuming a 10" record is the next record to be played, the spring 155 swings the arm 154 outwardly against the 10" record governing stop screw 156 and accordingly swings the bell crank lever 145 in a direction to properly position the tone arm stylus over the starting point of the playing groove of such 10" record.

Figure 17:
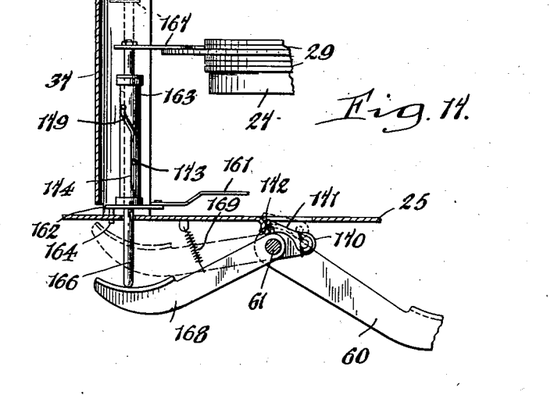
Figure 17 is a fragmentary vertical section taken on the plane of line 17—17, Figure 3, showing the mechanism that controls the playing of a 10" or 12" record.
Figure 18:
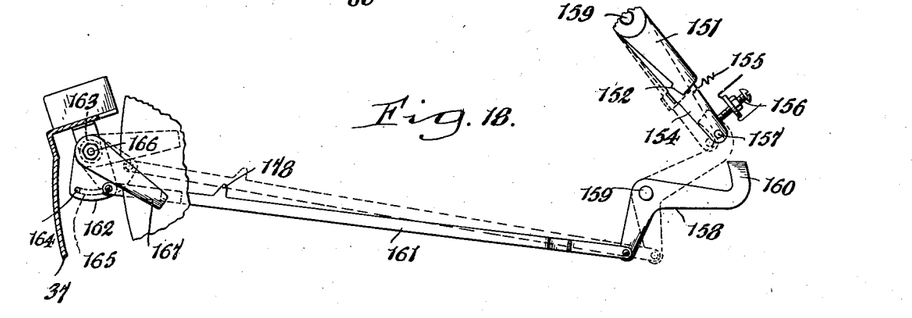
Figure 18 is a fragmentary top plan view, partly in section, of the same mechanism for controlling the playing of a 10" or 12" record.

When 12" records are promiscuously interspersed with 10" records in the record stack, a means is provided for pre-determining the position of the tone arm for playing the larger diameter record, such means in effect limiting or preventing the in-swing of the tone arm as is necessarily required for registering its stylus with the start of the playing groove of the records of smaller diameter. The position of the parts which govern the playing of a 12" record is shown by dotted lines in Figures 2 and 18, wherein the arm 154 is in a position corresponding to that wherein the tone arm stylus is in registration with the start of the playing groove of such record, and to prevent said arm swinging outwardly in contact with the 10" record governing screw 156, I employ a means for latching the arm 154 in such position. This means is preferably constructed as follows:

Disposed for releasable latching engagement with a pin 157 depending from the outer end of the lever 154 is a horizontally-swinging latching lever 158 pivoted intermediate its ends at 159 and provided on one of its arms with a hook-shaped portion 160 which, at a predetermined time, is adapted to hook around the pin 157 and hold the lever 54 and the tone arm in position for registration with a 12-inch record, such position being shown by dotted lines in Figure 18. The other arm of this latching lever is connected by a link 161 with a horizontally-swinging plate 162 fixed to the lower end of a sleeve 163 disposed adjacent one corner of the bracket 37 and having a pin 164 depending therefrom which is guided in an arcuate slot 165 formed in the base plate 25. Extending through this sleeve for vertical reciprocating movement relative thereto as well as for rotative movement therewith is a post 166 which is provided at its upper end with a pad 167 adapted for facial engagement with the marginal top side of a twelve-inch record in the record stack. The lower end of this post rests upon the free end of a vertically-swinging lever 168 loosely fulcrumed on the shaft 61 at a point between the companion levers 60 and having a spring 169 connected thereto for constantly urging it and the post 166 to the elevated position shown by dotted lines in Figure 17. Fixed on the shaft 61 adjoining the lever 168 is a crank arm 170 having a spring-pressed pawl 171 pivoted thereto which, during an upward swinging movement of the levers 60 in transferring a played record to a storage position above the record stack on the turntable, is adapted to engage a tooth 172 formed on the fulcrum end of the lever 168 to in turn depress the latter and permit its associated post 166 to drop by gravity to the full line position shown in Figure 17. Should there be a twelve-inch record in the stack on the turntable, the pad 167 will be intercepted by such record and arrest the further lowering movement of the post. In the event that there be one or more ten-inch records disposed above the twelve-inch record, the free end of the pad 167 will encounter the periphery of the record immediately above the twelve-inch record and thereby prevent any rotative movement being imparted to the pad 167 due to its frictional contact with the twelve-inch record. However, when no ten-inch record is present to arrest such movement, the pad 167 will be caused, due to its frictional engagement with a twelve-inch record, to swing inwardly. Applied to the post intermediate its ends is a radial pin 173 extending into a longitudinal slot 174 in the sleeve 163, so that when the pad 167 is swung inwardly by frictional contact with a twelve-inch record, as shown by dotted lines in Figure 18, a like motion will be transmitted to the sleeve and the plate 162 to in turn rock the latching lever 158 into latching engagement with the pin 157 on the lever 154, thereby setting the parts in proper position for playing a twelve-inch record. The presence of a 10" record on a 12" record, however, will defeat any operative latching stroke being transmitted to the parts because the edge of such 10" record will prevent the necessary turning movement being imparted to the pad 167.

During the lowering strokes of the levers 60, a means is provided for automatically releasing the latching lever 158 from its position for predetermining the playing of a 12" record. To this end a radial pin 175 on the shaft 61 is adapted at a predetermined time in the down stroke of the levers 60 to encounter one arm of a trip lever 176 pivoted intermediate its ends at 177 and having its other arm arranged in the path of a tooth or projection 178 projecting from the tie bar 161. As the trip lever is rocked by the shaft-pin 175, it causes the link 161 to be moved in a direction to rock the latching lever 158 to the released position shown by full lines in Figures 4 and 18.

For the purpose of governing the rotative movements of the post 166 to bring its pad 167 into and out of registration with a 12" record, the sleeve-slot 174 terminates at its upper end in a spiral portion 179, so that on the upstroke of the levers 60 in elevating a played record to its overhead stacked position, the lever 168 is swung downwardly to allow the post 166 to drop by gravity from the dotted line position to the full line position shown in Figure 17, during which time the post-pin 173 traverses the spiral portion of the sleeve-slot and causes the post to turn on its axis to present the pad 167 over the marginal plane of a 12" record, as shown by full lines in Figures 17 and 18. On the downstroke of the levers 60, the lever 168 is rocked upwardly by its spring 169 to elevate the post to the dotted line position shown in Figure 17, and during the tail end of such movement the post-pin 173 traverses the spiral portion 179 of the sleeve-slot and causes the post to turn in the opposite direction to swing the pad 167 clear of a 12" record to the position shown in Figure 3, so as not to interfere with the restoring stroke of the elevated record-stack back onto the turntable.

I claim as my invention:

1. A phonograph of the character described, comprising a turntable for supporting a stack of records to be reproduced while thereon from top to bottom of the stack, means disposed in overhead relation to the turntable for releasably supporting the records in stack-like arrangement after play, means successively engageable with the records for individually elevating them to a stacked position on said overhead supporting means, mechanism operatively connected to said record-elevating means and rendered operative upon the completion of playing a record for transferring such played record to the overhead supporting means, and means for effecting the release of the overhead record-stack from said supporting means at a predetermined time during the lowering of said elevating means to restore such stack onto the turntable.

2. In an automatic phonograph, a turntable for supporting a stack of records to be reproduced thereon, record supporting means disposed in overhead relation to the turntable for releasably receiving and retaining the records as they are played in stack-like fashion, elevating means disposed in correlation with the turntable and overhead support and operatively engageable with the records as they are successively played from the top to the bottom of the stack to transfer them to said overhead support and after all the records have been played to restore them as a stack to the turntable, and means governed by said elevating means at a predetermined time in the transfer of the last-played record for releasing the records from the overhead supporting means to permit the lowering of the elevated stack onto the turntable.

3. In an automatic phonograph, a turntable for supporting a stack of records to be reproduced thereon, record supporting means disposed in overhead relation to the turntable for releasably receiving and retaining the records as they are played in stack-like fashion, means disposed for elevating movement between the turntable and the overhead support and having members thereon movable at predetermined times to and from record-engaging positions for transferring the records individually after play to said support and collectively after all are played as a stack back to the turntable, mechanism for actuating said elevating means upon completion of the playing of a record including means operatively connected to the record-engaging members for governing their movement to and from a record-engaging position, and means governed by said elevating means at a predetermined time in the transfer of the last-played record for releasing said overhead supporting means from the records retained thereon to effect their restoration by said elevating means as a stack onto the turntable.

4. In an automatic phonograph, a turntable for supporting a stack of records to be successively reproduced thereon from the top to the bottom of the stack, means operable upon the completion of the reproduction of the records and successively engageable therewith for elevating them to a storage position in overhead spaced relation to the turntable, means spaced above the turntable for releasably supporting the records as a stack in such storage position, mechanism connected with said elevating means and rendered operable upon the completion of a reproduction to elevate the reproduced record to its storage position and, after the last record is played and elevated, to lower the reproduced records as a stack from their storage position back onto the turntable, and means governed by said elevating means at a predetermined time in the transfer of the last-played record for releasing the records from the overhead supporting means to permit the lowering of the elevated stack onto the turntable.

5. In an automatic phonograph, a turntable for supporting a stack of records to be reproduced while supported thereon, a record supporting means including releasable elements disposed above said turntable for receiving and retaining the records after play in stack-like arrangement, means operatively engageable with the records for transferring each record after play from the top of the turntable-stack to said supporting means and, after all the records are played, as a stack from the supporting means onto the turntable, mechanism connected with said transferring means and rendered operable upon the completion of a reproduction to present the reproduced record to said supporting means and after the last record is played to present the reproduced records as a stack back onto the turntable, and means operatively connected to the releasable elements of said supporting means and in governing relation to the record-transfer means for automatically actuating them in a record-releasing position at a predetermined time in the operation of said transfer means.

6. In an automatic phonograph, a turntable for supporting a stack of records to be reproduced thereon, record supporting means disposed in overhead relation to the turntable for receiving and supporting the records in stack-like arrangement after play, said means including a member in axial alinement with the turntable and having detents thereon for releasable supporting engagement with the records as they are presented thereto, record elevating means engageable with the records as they are successively played from top to bottom of the stack to transfer and present them to said overhead supporting means and after all the records have been played and transferred to lower and restore them as a stack onto the turntable, mechanism for actuating said elevating means upon the completion of playing a record, and means operatively connected to said record-engaging detents, and governed by said elevating means at a predetermined time in the transfer of the last-played record, for releasing the detents from their record supporting position to permit the lowering of the elevated stack onto the turntable.

7. In an automatic phonograph, a turntable for supporting a stack of records to be reproduced thereon, record supporting means disposed in overhead relation to the turntable for receiving and supporting the records in stack-like arrangement after play, said means including a vertically-displaced arm disposed in spaced relation to the turntable and provided at one end with a pendant, record-receiving post in substantially axial alinement with the turntable and having detent means thereon for releasable engagement with the records as they are presented thereto, record elevating means engageable with the records as they are successively played from the top to the bottom of the stack to transfer and present them to said post and after all the records have been played and transferred to lower and restore them as a stack onto the turntable, mechanism for actuating said elevating means upon the completion of playing a record, and means operatively connected to said detent means for automatically releasing them from supporting engagement with the overhead stack when the last record on the turntable has been played.

8. In a phonograph, a turntable to receive a stack of records for play, a support disposed in overhead spaced relation to the turntable for receiving and releasably retaining the records thereon as a stack after play, record elevating mechanism disposed in correlation with the turntable and overhead support for transferring the records individually after play to said support and as a stack from the support to the turntable after the records have been played, said mechanism including a member movable into engagement with a reproduced record for automatically positioning said member to effect the elevation of the record and out of engagement therewith after its elevation to the overhead support, and means operatively connected to said elevating mechanism for rendering it inoperative to move said member out of engagement with the elevated stack of records after the last record has been played and elevated and during the lowering of such stack onto the turntable.

9. In a phonograph, a turntable to receive a stack of records for play, a support disposed in overhead spaced relation to the turntable for receiving and releasably retaining the records thereon as a stack after play, record elevating mechanism disposed in correlation with the turntable and overhead support for transferring the records individually after play to said support and as a stack from the support to the turntable after the records have been played, said elevating mechanism including a plurality of spindles guided for vertical and rotative movements, members applied to said spindles for movement therewith into and out of supporting engagement with a record or the overhead stack of records, means operatively engageable with said spindles for controlling their vertical and rotative movements, and means operatively connected with said last-named means for rendering its rotative action inoperative after the last record played has been elevated and during the lowering of the elevated stack onto the turntable.

10. In a phonograph, a turntable to receive a stack of records for play, a standard disposed at one side of the turntable, an arm pivoted to said standard in spaced overhanging relation to the turntable and provided at its free end with a pendant post in axial alinement with said turntable for receiving records therefrom after they are played, pivoted dogs mounted on said post engageable at their lower ends with the records about their spindle-openings for releasably retaining them in stacked arrangement on the post and extending at their upper ends into said pivoted arm, means applied to said standard for releasable latching engagement with said arm to normally retain it in a substantially horizontal position, and means applied in part to said arm and operatively connected to said dogs for actuating them to a released position.

11. A mechanism for transferring records individually and successively as they are played from a stack arrangement on a turntable to a stacked storage position displaced therefrom and as a stack from such storage position back onto the turntable, comprising rotative elevating members disposed in operative relation to the turntable and movable at predetermined times into and out of supporting engagement with the record on the turntable for successively elevating them after play to the stacked storage position, means operatively connected to said members for controlling their rotation at predetermined times to and from cooperative engagement with a record and for transmitting a down and up stroke thereto during each record-transferring cycle and means operatively connected to said last-named means for rendering its rotative action inoperative after the last record played has been elevated and during the lowering of the records as a stack onto the turntable.

12. In an automatic phonograph, a turntable for supporting a stack of records to be reproduced while supported thereon, the turntable having a record-centering spindle rising therefrom for the records thereon, a bracket overhanging the turntable and its stack of records in spaced relation thereto and having a post depending therefrom in axial alinement with the turntable-spindle for receiving the records in stack-like fashion after play, releasable means on said depending post for supporting the played records thereon until all the records on the turntable have been reproduced, elevating means engageable with each record after play for discarding it after play from the top of the stack on the turntable and transferring it onto said post in supporting engagement with the releasable supporting means thereon, and means operatively connected to said releasable supporting means for releasing the latter from the overhead stack of played records to permit the lowering of such stack at a predetermined time in the transfer of the last-played record on the turntable.

13. In an automatic phonograph, a turntable adapted to support a plurality of superposed records thereon, a post disposed in axial spaced relation above the turntable having releasable detents thereon for supporting the records in stack-like fashion on said post after play, said detents having shoulders thereon engageable with the lowest record of such stack about the axial opening thereof, record-elevating means movable at given, predetermined times into engagement with a record on the turntable for elevating and presenting it to said post and in supporting engagement with its detents, said elevating means at another time lowering and returning the played stack of records onto the turntable, and means operatively connected to said detents for releasing them from supporting engagement with the played stack of records at a predetermined time to effect the automatic lowering of such stack by said elevating means back onto the turntable.

14. In a phonograph, a turntable to receive a stack of records for play, a support disposed in overhead spaced relation to the turntable for receiving and releasably retaining the records thereon as a stack after play, record elevating mechanism disposed in correlation with the turntable and overhead support for transferring the records individually after play to said support and as a stack from the support to the turntable after the records have been played, said elevating mechanism including a plurality of spindles guided for vertical and rotative movements, a pair of members applied to each spindle and spaced axially thereof a distance approximately equal to the thickness of a record, one of the members of a pair constituting a combined stop and clutching member for abutting engagement with the marginal top side of the uppermost record on the turntable to limit the downward travel of the spindle at the proper elevation for transferring such record and for imparting rotative movement to the spindle in one direction from the rotation of the engaged record, and the companion member constituting a pick-up member adapted to enter between the record to be elevated and that record immediately beneath it upon said clutching member engaging such record to be elevated, and means operatively engageable with said spindles for controlling their vertical movements and their rotation in a direction to present said members at predetermined times to and from cooperative engagement with a record.

15. In a phonograph, a turntable to receive a stack of records for play, a support disposed in overhead spaced relation to the turntable for receiving and releasably retaining the records thereon as a stack after play, record elevating mechanism disposed in correlation with the turntable and overhead support for transferring the records individually after play to said support and as a stack from the support to the turntable after the records have been played, said elevating mechanism including a plurality of spindles guided for vertical and rotative movements, a pair of members applied to each spindle and spaced axially thereof a distance approximately equal to the thickness of a record, one of the members of a pair constituting a combined stop and clutching member for abutting engagement with the marginal top side of the uppermost record on the turntable to limit the downward travel of the spindle at the proper elevation for transferring such record and for imparting rotative movement to the spindle in one dirction from the rotation of the engaged record, and the companion member constituting a pick-up member adapted to enter between the record to be elevated and that record immediately beneath it upon said clutching member engaging such record to be elevated, means operatively engageable with said spindles for controlling their vertical movements and their rotation in a direction to present said members at predetermined times to and from cooperative engagement with a record, and means operatively connected with said last-named means for rendering its rotative action inoperative after the last record played has been elevated and during the lowering of the elevated stack onto the turntable.

16. In a phonograph, a turntable to receive a stack of records for play, a support disposed in overhead spaced relation to the turntable for receiving and releasably retaining the records thereon as a stack after play, record elevating mechanism disposed in correlation with the turntable and overhead support for transferring the records individually after play to said support and as a stack from the support to the turntable after the records have been played, said elevating mechanism including a plurality of spindles guided for vertical and rotative movements, a pair of members applied to each spindle and spaced axially thereof a distance approximately equal to the thickness of a record, one of the members of a pair constituting a combined stop and clutching member for abutting engagement with the marginal top side of the uppermost record on the turntable to limit the downward travel of the spindle at the proper elevation for transferring such record and for imparting rotative movement to the spindle in one direction from the rotation of the engaged record, and the companion member constituting a pick-up member adapted to enter between the record to be elevated and that record immediately beneath it upon said clutching member engaging such record to be elevated, means operatively engageable with said spindles for normally controlling their vertical and rotative movements during the successive transfer of the records from the turntable to the stack-support, and means correlated with said spindle-controlling means for preventing rotation of said spindles out of their record-supporting positions in their down stroke during the lowering of the stack of records to their initial position on the turntable.

THEODORE M. WRIGHT.